(12) United States Patent
Khorasgani et al.

(10) Patent No.: US 12,536,474 B2
(45) Date of Patent: Jan. 27, 2026

(54) BOOSTING DEEP REINFORCEMENT LEARNING PERFORMANCE BY COMBINING OFF-LINE DATA AND SIMULATORS

(71) Applicant: Hitachi, Ltd., Tokyo (JP)

(72) Inventors: Hamed Khorasgani, San Jose, CA (US); Haiyan Wang, Fremont, CA (US); Maria Teresa Gonzalez Diaz, Mountain View, CA (US); Chetan Gupta, San Mateo, CA (US)

(73) Assignee: HITACHI, LTD., Tokyo (JP)

(*) Notice: Subject to any disclaimer, the term of this patent is extended or adjusted under 35 U.S.C. 154(b) by 1157 days.

(21) Appl. No.: 17/488,141

(22) Filed: Sep. 28, 2021

(65) Prior Publication Data

US 2023/0107725 A1   Apr. 6, 2023

(51) Int. Cl.
*G06N 20/20* (2019.01)
*G06N 5/043* (2023.01)

(52) U.S. Cl.
CPC ............. *G06N 20/20* (2019.01); *G06N 5/043* (2013.01)

(58) Field of Classification Search
CPC ................................ G06N 20/20; G06N 5/043
See application file for complete search history.

(56) References Cited

U.S. PATENT DOCUMENTS

| | | | | |
|---|---|---|---|---|
| 12,416,921 B2* | 9/2025 | Redford | .................... | G06N 3/08 |
| 2019/0065687 A1* | 2/2019 | Mei | .................... | G06F 16/90335 |
| 2021/0326717 A1* | 10/2021 | Mueller | .................... | G06Q 10/06 |
| 2021/0357767 A1* | 11/2021 | Fuerst | .................... | G06N 5/022 |
| 2022/0405531 A1* | 12/2022 | Stanton | .................... | G06N 20/20 |

OTHER PUBLICATIONS

Modi et al. (Sample Complexity of Reinforcement Learning using Linearly Combined Model Ensembles, Oct. 2019, pp. 1-17) (Year: 2019).*
Chen et al. (Batch Exploration with Examples for Scalable Robotic Reinforcement Learning, Apr. 2021, pp. 1-11) (Year: 2021).*
Chua et al. (Deep Reinforcement Learning in a Handful of Trials using Probabilistic Dynamics Models, Nov. 2018, pp. 1-17) (Year: 2018).*

(Continued)

*Primary Examiner* — George Giroux
(74) *Attorney, Agent, or Firm* — PROCOPIO, CORY, HARGREAVES & SAVITCH LLP

(57) ABSTRACT

Example implementations described herein involve an approach to address an imperfect simulator challenge using off-line data plus reward modification. The proposed solution is robust to simulator error, and therefore, it requires less maintenance in keeping the simulators updated. Even when the simulators are accurate, it is costly to keep them accurate over time. Moreover, compared to other robust reinforcement learning algorithms, the proposed approach does not assume the distribution of uncertainties in the simulator are known. Less complexity leads to fewer potential errors as well as lower computational cost during the training. Finally, the proposed approach has better performance compared to the state-of-the-art methods (higher overall cumulative rewards).

19 Claims, 14 Drawing Sheets

(56) References Cited

OTHER PUBLICATIONS

Lee et al. (Sunrise: A Simple Unified Framework for Ensemble Learning in Deep Reinforcement Learning, Jun. 2021, pp. 1-20) (Year: 2021).*
Arnold et al., "Challenges of Real-World Reinforcement Learning", Proceedings of the 36th International Conference on Machine Learning, PMLR 97, 2019.
Dulac-Arnold et al., "An empirical investigation of the challenges of real-world reinforcement learning", Mar. 4, 2021, pp. 1-47.
Redmon et al., "You Only Look Once: Unified, Real-Time Object Detection", University of Washington, May 9, 2016.
Zhu et al., "Unpaired Image-to-Image Translation using Cycle-Consistent Adversarial Networks", Berkeley AI Research (BAIR) laboratory, UC Berkeley, Aug. 24, 2020.
Peng et al., "Sim-to-Real Transfer of Robotic Control with Dynamics Randomization", UC Berkeley, Department of Electrical Engineering and Computer Science, Mar. 3, 2018.
Lakshminarayanan et al., "Simple and Scalable Predictive Uncertainty Estimation using Deep Ensembles", 31st Conference on Neural Information Processing Systems, (NIPS 2017), Long Beach, CA Nov. 4, 2017.
Yu et al., "MOPO: Model-based Offline Policy Optimization", 34th Conference on Neural Information Processing Systems (NeurIPS 2020), Vancouver, CA Nov. 22, 2020.
Di-Castro Shashua et al., "Deep Robust Kalman Filter", Israel Institute of Technology, Haifa, Israel Mar. 7, 2017.
Silver et al., "Mastering the game of Go with deep neural networks and tree search", 484, Nature, vol. 529, Jan. 28, 2016.
He et al., "Mask R-CNN", Facebook AI Research (FAIR), Jan. 24, 2018, pp. 1-12.
European Patent Office. European Search Report mailed Jun. 2, 2022. European Patent Application No. 21 21 5247. Name of Applicant: Hitachi, Ltd. English Language. 8 pages.
Rafailov, Rafael et al. Offline Reinforcement Learning From Images with Latent Space Models. © R. Rafailov, T. Yu, A. Rajeswaran C. Finn. Retrieved: arXiv:2012.11547v1 [cs.LG] Dec. 21, 2020. 20 pages.
Ghosh, Supriyo et al. A Deep Ensemble Multi-Agent Reinforcement Learning Approach for Air Traffic Control. Retrieved: arXiv:2004.01387v1 [cs.LG] Apr. 3, 2020. 8 pages.

* cited by examiner

BOOSTING DEEP REINFORCEMENT LEARNING PERFORMANCE BY COMBINING OFF-LINE DATA AND SIMULATORS

BACKGROUND

Field

The present disclosure is directed to reinforcement learning, and more specifically, to boosting deep reinforcement learning performance by combining off-line data and simulators.

Related Art

In Reinforcement Learning (RL) algorithms as it is shown in FIG. 1 an agent in state, x, takes action u and receives reward r form the environment, E. An RL algorithm learns a policy, $\Pi(u|x)$, that generates a set of actions, u, that maximize the expected sum of rewards $R=\Sigma r$ in the environment. The reward functions typically capture the goals of the agent. Deep RL has expanded the performance of the RL algorithm by using deep neural networks to learn more complex policies.

The extraordinary performance of deep RL in games such as chess suggests that deep RL can be a strong candidate for solving complex real-world problems in different industries. Deep RL can solve problems even when the consequences of an action are not immediately obvious. For example, a move in chess may result an immediate loss but also leads to better long-term performance. Moreover, deep RL algorithms can learn an optimal solution without requiring detailed knowledge of the systems or their environment. For example, such solutions can learn to play chess and go through trial and error without requiring a game strategy. This feature of deep RL can be very helpful to address complex engineering problems where our knowledge of the system is limited. Finally, deep RL can use variety of sensor measurements such as time series data, vision, and voice.

However, deep RL has not been applied to address real world industrial problems in a meaningful way. There are several key issues that limit the application of deep RL to real-world problems. Deep RL algorithms typically require many samples during training (sample complexity). This can be a challenge in real world applications. Unlike game environments or even some real-world lab experiments such as the robotic arm, it is not possible to train RL algorithms in the real world when it comes to the industrial applications such as production lines or mining operations. Safety has been discussed in the literature as the main obstacle in training deep RL in real world applications. In applications such as autonomous robots, the hazard caused from exploration during the training is the main issue preventing the learning of deep RL policies in the real world. Several solutions have been proposed for safe exploration for RL. However, these technologies are in very early stages.

In many real-world applications such as dynamic dispatching for mining operation, safety is not a major obstacle. Despite efforts to automate the mines, the trucks are still driven by human operators and therefore, there is no significant safety issue associated with allocating a truck to a wrong shovel or dump for exploration. However, the pure cost of such an experiment makes it impractical. Each mine typically operates in 8-hour or 12-hour shifts and the goal of dynamic dispatching is to maximize the overall production during each shift. Recently, there have been significant improvements in sample efficiency of deep RL. Techniques such as replay buffer, value estimation methods, imagination rollouts, and model-based guided policy search have improved sample efficiency of deep RL algorithms significantly. However, even the most efficient deep RL requires hundreds or thousands of episodes before converging, and in dynamic dispatching, that would be equal to asking the mine management to have the full mine operating in suboptimal capacity for days or even years just to come up with an efficient policy. No matter how great the potential gain can be, this is simply too high of a cost for an operating mine to pay.

Typically, the industries have access to plenty of off-line operation data. The more advanced industries are connected to the cloud and their operation data history is recorded with a high frequency. In fact, most industries use the historical data to estimate different variables such as demand or production time. Since the industries are already using their historical data to learn and update different supervised deep learning models in a periodic manner, one may ask why these industries are not using the off-line data to learn optimal policies using deep RL. The extrapolation error prevents related art deep RL algorithms such as deep Q-network (DQN) and Deep Deterministic Policy Gradients (DDPG) to learn efficient policy from off-line datasets. Even though some progress has been made in off-line deep RL, the technology is still in its early stages and to the best of our knowledge there has been no work that has applied off-line RL successfully to a largescale real-world application.

With the high cost of training in a real mine, and limitations of off-line learning, using simulators to learn deep learning policy is the only practical approach. Simulator is a software environment which represents a replica of the real system. Typically, the simulators are developed by using historical data and the laws of physics. Instead of training neural networks by real-life experiments, we can use high-fidelity simulators to generate realistic scenarios. For example, for learning a self-driving policy instead of having a car driving in the streets, we can use a simulator which models vehicle operation in the traffic.

FIG. 2 illustrates an example use of simulators to train the RL algorithm. Given the limitations of real-world training, the industries usually use simulators to train the RL algorithm. However, the policy learned on simulator may not work on real-world because the simulators are not 100% accurate.

Developing and maintaining accurate simulators is expensive and sometimes infeasible. Real industrial systems such as mines and factories are often much more complicated compared to the developed simulators. Changes in the environment such as weather and road conditions, complications associated with operating humans in the loop, and possible failures make what agents may experience in the real world much more complex. There have been several attempts to address the uncertainties in the simulators. These approaches typically consider Markov Decision Process (MDP) formulation, model noise and uncertainty as bounded unknown variables and optimize the network for the worst-case scenario. The obvious problem with these methods is that by considering the worst-case scenario, the solutions tend to be very conservative. Related art implementations involve an algorithm which focuses on the uncertainty distributions instead of the worst-case scenario to avoid the overly conservative policies. In other related art implementations, dynamics randomization is used to randomize a robotic arm simulator parameter such as mass, friction, and time-step between actions in each episode in a simulator during the training to learn a robust policy, and apply the policy to the real robotic arm.

Even though their results seem promising for their relatively simple case studies, it is much harder to generate realistic perturbations in a real-world industrial simulator with human operators in the loop. In many industrial applications, uncertainties cannot be modeled using additional parameters. For example, it is common that a traffic jam is encountered in a real mine because of weather, road conditions, or an accident. A traffic jam can change the entire dynamic model of the mine and cannot be modeled with simple parameters.

Simulator randomization is one of the most common approaches in addressing uncertainties in the simulators. In these methods, agents are trained on various perturbations of the simulator and optimize the policy for minimizing on the average errors during the training. Robust RL is another common approach to address uncertainties in the simulators by using Robust Markov Decision Processes (RMDPs). These methods assume the simulator has a known uncertainty structure and derive a robust optimal policy for the worst-case or the most common scenarios.

Both domain randomization, and Robust RL assume the distribution of uncertainties in the simulators are known. These methods often use real-life data to learn uncertainty distributions in the simulators. Relying on real-life data to estimate uncertainties can be misleading in real applications. In many real-life applications, the real data does not cover the entire environment's distribution. That is one of the primary reasons that learning optimal policy from off-line data (Batch RL) is a very challenging task. Off-line data are often gathered under a specific policy in place at a time and leave many possible scenarios out. On the other hand, simulators are often derived from physics of the system and trusting the simulator when we are out of the off-line data distribution is often the best choice.

FIG. 3 illustrates an example Venn diagram of simulator and off-line data accuracy. As illustrated in FIG. 3, neither the off-line data nor the simulator covers the entire environment. Using the fact that the off-line data is only accurate in a subset of the environment, related art implementations have used reward modification approach to prioritize searching for an optimum policy inside off-line data distribution. Such a solution includes the following three steps: 1) learn an ensemble of models using off-line data, 2) Use the error between these models as an uncertainty indicator, 3) Add a negative term to the reward value proportional to the uncertainty indicator. By assigning negative term to the reward value proportional to the uncertainty indicator, they discourage the agent to explore areas where the off-line data is not accurate. FIG. 4 illustrates how negative reward discourages the agent to explore areas where the off-line data is not accurate.

SUMMARY

In example implementations described herein, off-line RL is used to develop a solution based on reward modification to address imperfect simulator challenge using off-line data.

In example implementations described herein, there is a method for boosting imperfect simulator performance by using off-line data and reward modification. Example implementations use the off-line data to learn an ensemble of system dynamic models. The learned dynamic models are used to quantify uncertainty. During the training, example implementations switch between the ensemble of models and the simulator depending on the reliability of each model. Moreover, the reward function is modified to incentivize exploration in areas where the simulator and off-line data are accurate. Compared to other robust RL algorithms, the proposed solution is computationally more efficient and has a better performance.

RL has shown superhuman performance for several game environments such as chess and Go. However, its application has remained limited in real-world applications. The state-of-the-art RL algorithms need thousands of trial-and-error episodes to learn optimal policies. Unlike games, it is often expensive or even dangerous to perform thousands of episodes on a real system for the learning purposes. Therefore, in many real-world applications, there is a need for a computer simulator to learn a policy. Unfortunately, it is often not feasible to develop perfect simulators for complex real-world systems.

Addressing possible inaccuracies in the simulators is essential in adopting RL applicable in real-world applications.

Example implementations described herein involve a solution based on reward modification to address imperfect simulators using off-line data. The proposed solution learns an ensemble of models using off-line data. It then assigns a negative reward proportional to the error between the ensemble of models and the simulator. This encourage the agent to explore the areas where the simulator and off-line data are both accurate. Finally, example implementations involve an algorithm to switch between the simulator and the ensemble of models based on their accuracy.

Aspects of the present disclosure can involve a method for training of a reinforcement learning policy, which can include executing an ensemble of models and a simulator to predict a next state, the ensemble of models trained from using off-line data; for predictions of the next state from the execution of the ensemble of models being in disagreement, using the next state predicted from the execution of the simulator as a sample for training the reinforcement learning algorithm; and imposing a penalty on the reward for the training the reinforcement learning algorithm based on a variance of the predictions of the next state from the ensemble of models; for the predictions of the next state from the execution of the ensemble of models being in agreement, using weighted predictions of the next state from the execution of the ensemble of models as the sample for training the reinforcement learning algorithm; and adjusting the reward on the ensemble of models based on the variance of the predictions of the ensemble of models and a difference between the predictions of the next state from the execution of the ensemble of models and the next state predicted from the execution of the simulator.

Aspects of the present disclosure can involve a computer program, storing instructions for training of a reinforcement learning policy, which can include executing an ensemble of models and a simulator to predict a next state, the ensemble of models trained from using off-line data; for predictions of the next state from the execution of the ensemble of models being in disagreement, using the next state predicted from the execution of the simulator as a sample for training the reinforcement learning algorithm; and imposing a penalty on the reward for the training the reinforcement learning algorithm based on a variance of the predictions of the next state from the ensemble of models; for the predictions of the next state from the execution of the ensemble of models being in agreement, using weighted predictions of the next state from the execution of the ensemble of models as the sample for training the reinforcement learning algorithm; and adjusting the reward on the ensemble of models based on the variance of the predictions of the ensemble of models and a difference between the predictions of the next state from the execution of the ensemble of models and the next state predicted from the execution of the simulator. The instructions of the computer program can be stored in a non-transitory computer readable medium and executed by one or more processors.

Aspects of the present disclosure can involve a system for training of a reinforcement learning policy, which can include means for executing an ensemble of models and a simulator to predict a next state, the ensemble of models trained from using off-line data; for predictions of the next state from the execution of the ensemble of models being in disagreement, means for using the next state predicted from the execution of the simulator as a sample for training the reinforcement learning algorithm; and means for imposing a penalty on the reward for the training the reinforcement learning algorithm based on a variance of the predictions of the next state from the ensemble of models; for the predictions of the next state from the execution of the ensemble of models being in agreement, means for using weighted predictions of the next state from the execution of the ensemble of models as the sample for training the reinforcement learning algorithm; and means for adjusting the reward on the ensemble of models based on the variance of the predictions of the ensemble of models and a difference between the predictions of the next state from the execution of the ensemble of models and the next state predicted from the execution of the simulator.

Aspects of the present disclosure can involve an apparatus for training of a reinforcement learning policy, which can include a processor configured to execute an ensemble of models and a simulator to predict a next state, the ensemble of models trained from using off-line data; for predictions of the next state from the execution of the ensemble of models being in disagreement, use the next state predicted from the execution of the simulator as a sample for training the reinforcement learning algorithm; and impose a penalty on the reward for the training the reinforcement learning algorithm based on a variance of the predictions of the next state from the ensemble of models; for the predictions of the next state from the execution of the ensemble of models being in agreement, use weighted predictions of the next state from the execution of the ensemble of models as the sample for training the reinforcement learning algorithm; and adjust the reward on the ensemble of models based on the variance of the predictions of the ensemble of models and a difference between the predictions of the next state from the execution of the ensemble of models and the next state predicted from the execution of the simulator.

DETAILED DESCRIPTION

Figure 1:
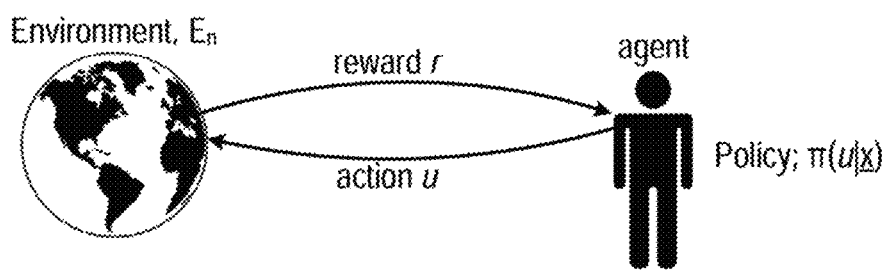
FIG. 1 illustrates an example of training on a real-world system.
Figure 2:
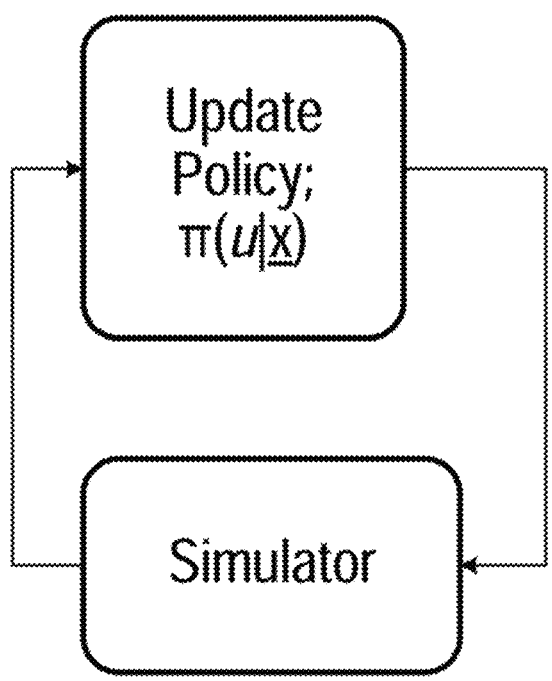
FIG. 2 illustrates example use of simulators to train the RL algorithm.
Figure 3:
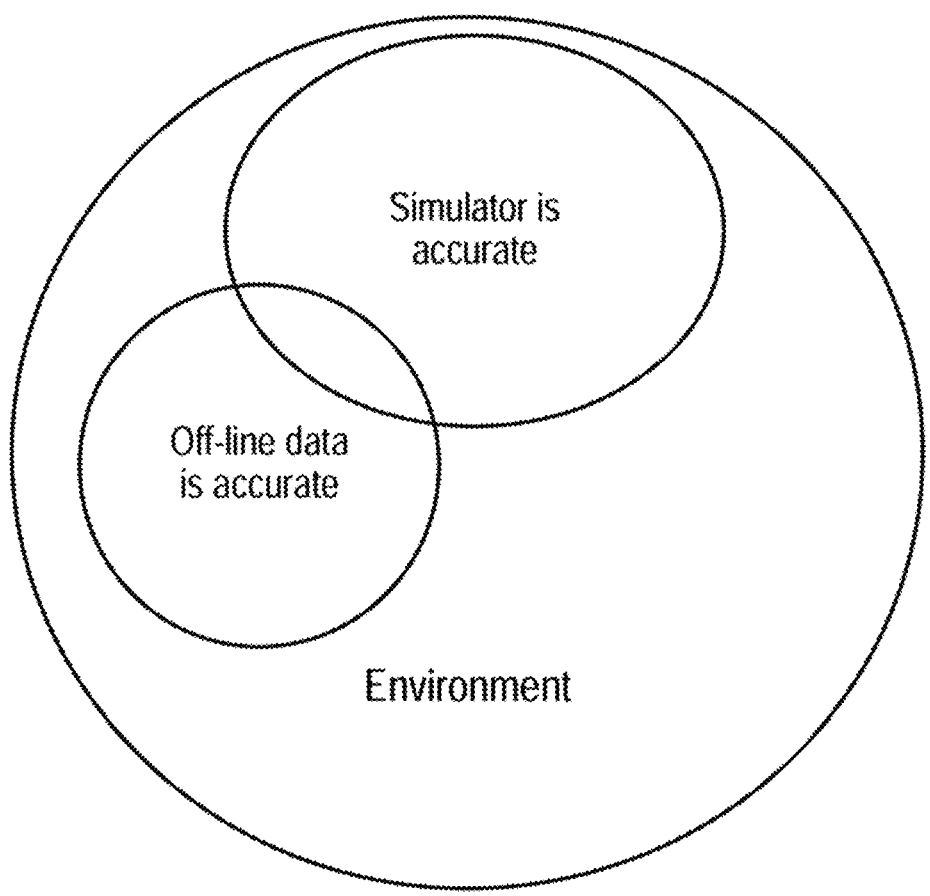
FIG. 3 is a Venn diagram of simulator and off-line data accuracy.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein use a reward modification approach to combine the off-line data and the simulator.

To train the reinforcement algorithm, example implementations use an off-policy algorithm such as Soft Actor Critic (SAC). Such algorithms save the current state (observation), $o_k$, the action, $u_k$, and the next state (next observation), $o_{k+1}$, and the reward $r_k$ in a buffer and at each iteration they sample a batch of $(o_k, o_{k+1}, a_k, r_k)$ to train the policy. In example implementations described herein, the method to generate next state $o_{k+1}$ and reward $r_k$ are modified to address the problems with an imperfect simulator and using off-line data.

Off-line data is used to learn an ensemble of models, $model_r$. This step can be done separately and before the start of the training the reinforcement learning algorithm. Most industrial systems have plenty of data from their operation over years and this data can be used to estimate the dynamic system.

$$o_{k+1}^r, r_k^r = model_r (o_k, u_k)$$

The dynamic model learns the mapping from the current state $o_k$, and action $u_k$, to the next state $o_{k+1}^r$, and reward $r_k^r$. In machine learning it is possible to learn multiple models to predict a variable instead of only one model. These models are called "ensemble of models". Ensemble learning can improve prediction performance, but also can be used to quantify the uncertainty in the prediction. High variance among the predictions means the models are in disagreement and therefore, the prediction is uncertain. This technique is used to quantify uncertainty in the models used herein.

Moreover, the difference between the simulator and the ensemble prediction is used to quantify the accuracy of our simulator.

During the reinforcement learning training, both the simulator and the ensemble of models are run in parallel. The standard deviation of the outputs from the ensemble of models is used to quantify the reliability of their prediction. Toward this end, the weighted standard deviation of real model outputs is computed: reward and next state.

$$\sigma_r = \omega_1 \sigma(r_r(k)) + \omega_2 \sigma(o_r(k+1)),$$

where $\sigma(r_r(k))$ represents the standard deviation of rewards and $\sigma(o_r(k+1))$ represents the standard deviation of the next state, $\omega_1$ and $\omega_2$ are constant weights. Low $\sigma_r$ shows the ensemble of models are in agreement with each other. When the ensemble of models are in agreement, they can be considered to be accurate and therefore, the average of ensembles can thereby be used to predict the next step and the original reward. The "average of ensembles" can involve the average of the outputs of the ensemble of models. For example, suppose there are ten models, and each predicts a value for the next state. The average of these values can be used as the prediction result. In fact, if the standard deviation of predicted values is low, the ensemble of models can be trusted over the simulator.

Note that the uncertainties in the simulators may not be quantifiable. Therefore, when the ensemble of models is reliable, the ensemble of models are used instead of the simulator. For the situation in which simulator uncertainty can be quantified, a weighted average of the simulator and the ensemble of learned models is used for predicting the next observation and the reward. The weights are based on uncertainties in ensemble of learned models and the simulator. Suppose the simulator predicts the reward is 8 with standard deviation 2, and the ensemble of models predict the reward is 7 by standard deviation 3. A weighted average of them is used as the prediction for the reward: $(3/(2+3))*8 + (2/(2+3))*7 = 7.6$ The prediction is weighted more toward 8 than 7 because the 8 prediction is less uncertain (e.g., has lower standard deviation below a threshold).

When the ensemble of models are in disagreement (e.g., the prediction has high standard deviation beyond a threshold), the simulator is used to predict next observation and the reward. In this case, the ensemble of models learned from the off-line data cannot be trusted and, therefore, the simulator is used as the alternative.

$$r_k^s, o_{k+1}^s = \text{simulator}(o_k, u_k)$$

When the off-line data is not accurate (e.g., the prediction has high standard deviation beyond a threshold), a penalty is added based on the standard deviation of the prediction of the ensemble of models to encourage the agent to explore the areas which the off-line data is more accurate:

$$r_{new} = r_k^s - \sigma_r$$

This penalty term acts similar to the related art off-line RL method by prioritizing learning policies which are in the accurate off-line data distribution. Note that here the simulator reward, $r_k^s$, is used as the original reward. Moreover, to encourage the agent to explore the areas which the simulator is accurate, when the ensemble of models are in agreement (e.g., have low standard deviation below a threshold), an additional penalty is added based on the error between the average of the prediction of the ensemble of models and the simulator prediction:

$$d\omega_3|r_r^-(k) - r_s^-(k)| + \omega_4|o_r^-(k+1) - o_s^-(k+1)|,$$

where $\omega_3$ and $\omega_4$ are hyper parameters determined by the user. In this case, the final reward is:

$$r_{new} = r_k^r - \alpha_1 \sigma_r - \alpha_2 d$$

where $\alpha_1$ and $\alpha_2$ represent hyper parameters determined by the user. This reward function prioritizes learning policies which are in the accurate off-line data and accurate simulator distribution. Note that here we used the reward from the ensemble of models $r_k^r$ as the original reward. Algorithm 1 below represents the overall training process.

---

Algorithm 1: Boosting RL Performance by Combining Off-line Data with Simulators

---

Hyper parameters: $\omega_1, \omega_2, \omega_3, \omega_4, \alpha_1, \alpha_2$ ;
Learn an ensemble of models to predict next step, o(k + 1), given the current
  encoded state, o(k) and the action, u(k), at each time step k using the
  real-world data: r(k), o(k + 1) = model$_r$(o(k), u(k));
Initialize RL policy;
Initialize buffer D={ };
for each learning iteration do
|    Initialize the simulator;
|    for each step do
| |    Use the ensemble of models and the RL policy to generate the next
| |       state and reward r$_r$(k), o$_r$(k + 1) = model$_r$(o(k), u(k)) ;
| |    Use the simulator and the RL policy to generate the next state and
| |       reward r$_s$(k), o$_s$(k + 1) = simulator(o(k), u(k)) ;
| |    Compute weighted standard deviation of real model output
| |       $\sigma_r = \omega_1 \sigma(r_r(k)) + \omega_2 \sigma(o_r(k + 1))$ ;
| |    Compute weighted difference between average of real model
| |       output and simulator output
| |       d = $\omega_3|\bar{r}_r(k) - \bar{r}_s(k)| + \omega_4|\bar{o}_r(k + 1) - \bar{o}_s(k + 1)|$ ;
| |    if $\sigma_r$ is lower than a pre-defined threshold then
| | |    r$_{new}$ = r$_r$(k) − $\alpha_1 \sigma_r$ − $\alpha_2$d ;
| | |    Add sample set (r$_{new}$, o$_r$(k + 1), o(k), u(k)) to the buffer D ;
| | |    o(k) = o$_r$(k + 1) ;
| |    else
| | |    r$_{new}$ = r$_s$(k) − $\sigma_r$ ;
| | |    Add sample set (r$_{new}$, o$_s$(k + 1), o(k), u(k)) to the buffer D;
| | |    o(k) = o$_s$(k + 1) ;
| |    end

| | | Algorithm 1: Boosting RL Performance by Combining Off-line Data with Simulators |
|---|---|---|
| | | | | Sample a batch from D and Train RL |
| | | end | |
| end | | |

Figure 5:
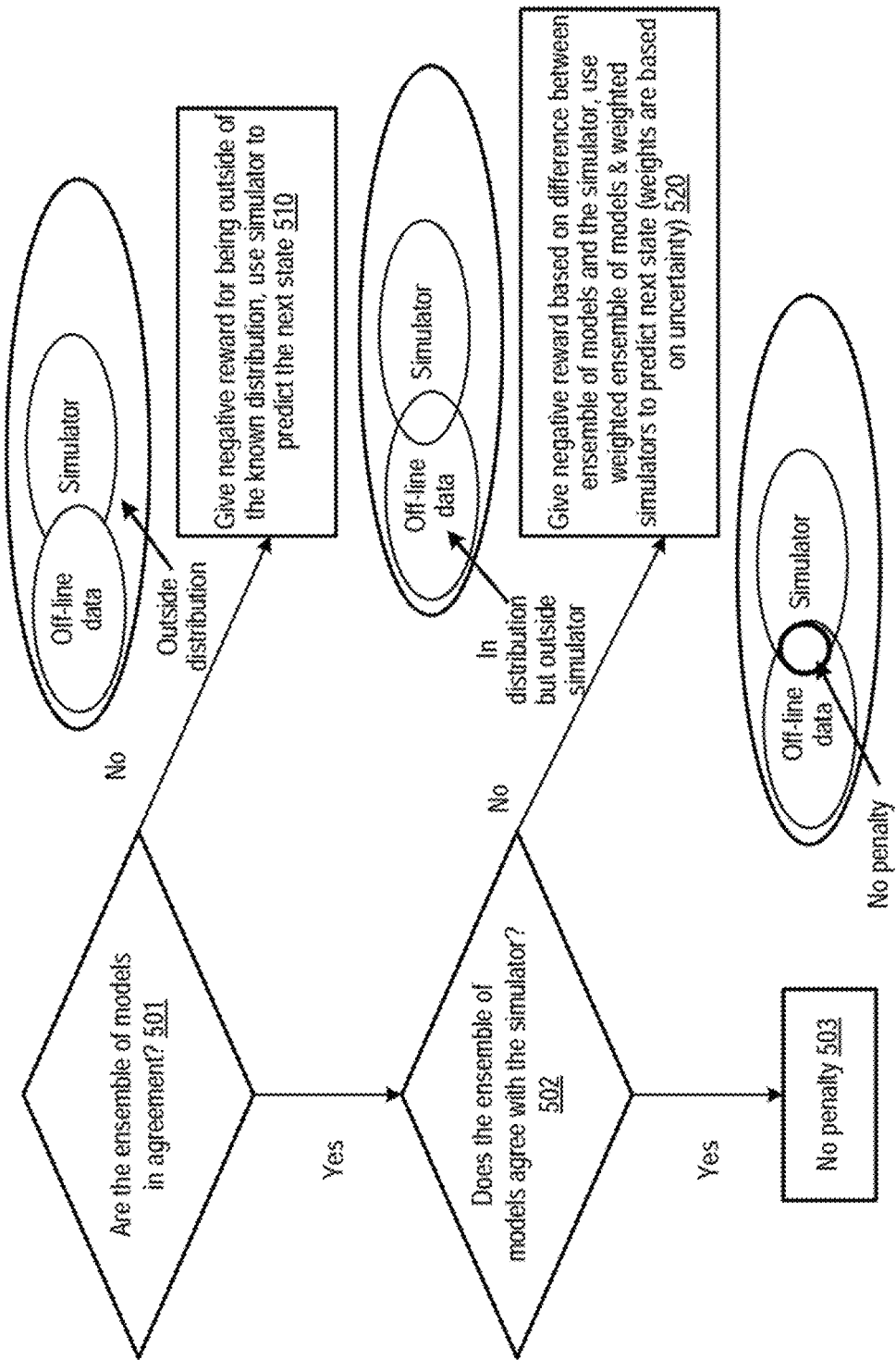
FIG. 5 is a flowchart representing learning process for different scenarios for Algorithm 1.

FIG. 5 illustrates an example flowchart of the different scenarios of Algorithm 1. At 501, a determination is made as to whether the ensemble of models are in agreement (e.g., having a standard deviation lower than a threshold). If not (No), then a negative reward is imposed for being outside of the known distribution, and the simulator is used to predict the next state at 510. Otherwise (Yes), the flow proceeds to 502 to determine whether the ensemble of models are in agreement with the simulator. If not (No), then a negative reward is imposed based on the difference between ensemble of models and the simulator. Weights are applied to each of the ensemble of models and the simulator(s) to predict the next state, wherein the weights are set based on the uncertainty at 520. Otherwise (Yes), the flow proceeds to 503, in which the simulator and the ensemble of models are in agreement.

Note that when the simulator and the ensemble of models agree with each other, and therefore generate the same next state and reward, no penalty is imposed to the original reward at 503:

$$d=0, \sigma_r=0$$

Figure 6:
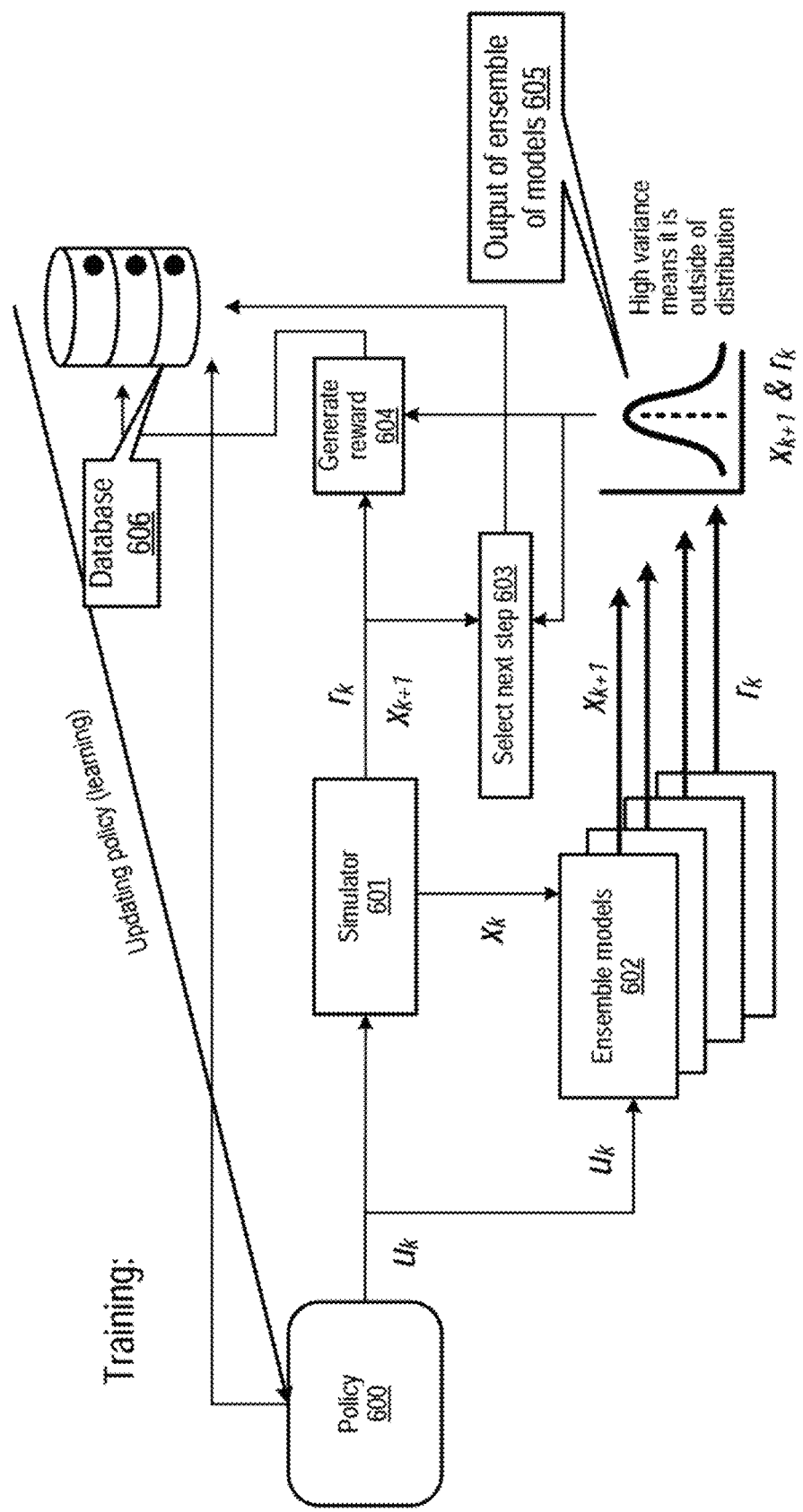
FIG. 6 illustrates the training of the RL policy using ensemble of models and the off-line data.
Figure 7:
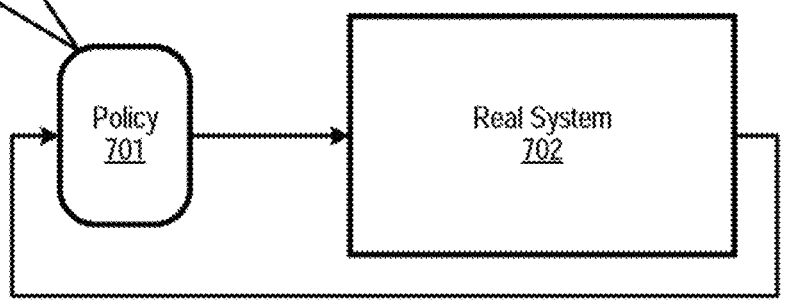
FIG. 7 illustrates that after the training, the RL policy is applied to the real system.

FIG. 6 and FIG. 7 illustrate the training and application steps. Specifically, FIG. 6 illustrates the training of the RL policy using ensemble of models and the off-line data. Policy 600 is the RL policy used to conduct the RL. The goal is to learn a policy from the simulator and the ensemble of models. Based on the policy 600, the simulator 601 and the ensemble models 602 are executed to conduct the flow of FIG. 5 and Algorithm 1. The ensemble of models is learned from off-line real data. Based on the output 605 of the ensemble of models and the simulator, the flow selects the next step at 603 and modifies the reward at 604 to combine the off-line data and simulator as illustrated in Algorithm 1. The modified reward at 604 is stored in the database at 606 to use for the training the models through reinforcement learning and is provided to the reinforcement learning policy 600 to update or train the reinforcement learning policy 600.

FIG. 7 illustrates that after the training, the RL policy is applied to the real system. Once the reinforcement learning policy is learned, this policy is deployed at 701 to generate optimal actions in a real-life application.

Figure 8B:
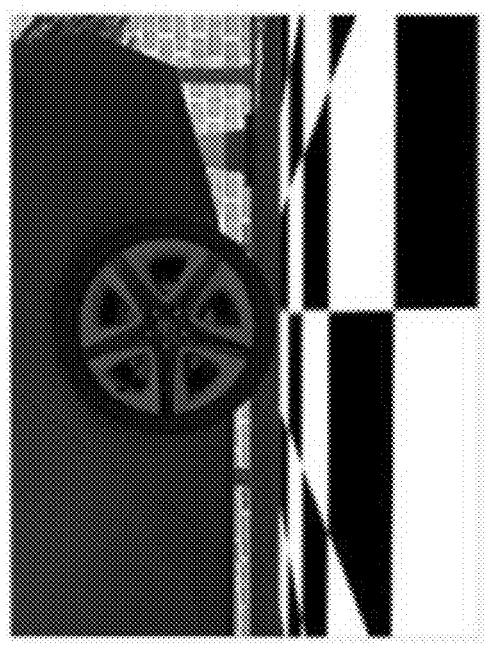
FIGS. 8A to 8D illustrate how a domain adaptation is needed to address the difference between real-world data and simulator environment data.
Figure 8A:
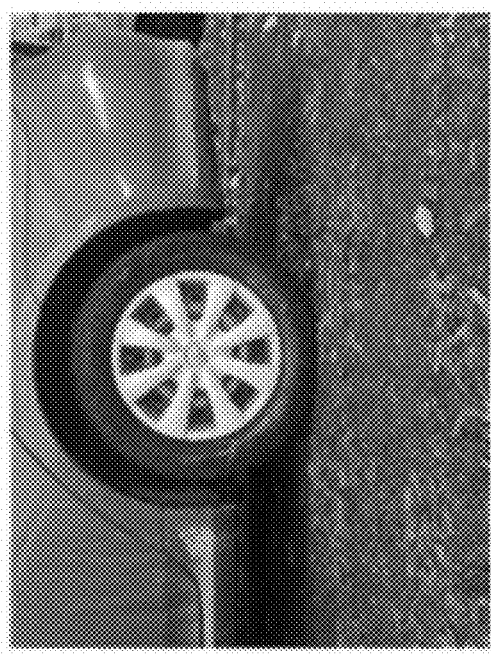

FIGS. 8A to 8D illustrate how a domain adaptation is needed to address the difference between real-world data and simulator environment data. Example implementations described herein can also utilize image and control from image. To combine off-line data with the simulator, the domain adaptation problem needs to be addressed. For example, consider the case where the goal is to train an inspector robot to move to the right location to take a picture of one of the rear tires. For image data, the domain adaptation is required to transfer data from the simulator environment to the real-world environment as it is shown in FIGS. 8A and 8B. For domain adaptation different image translation techniques such as Cycle-GAN or other techniques can be used to translate images from one environment to another one.

Alternatively, a feature extraction network can be used to extract similar features from both the real-world and the simulator environment. For the inspector robot example, techniques such as Mask R-CNN can be used to detect the tire in both the real world and in the simulator. The output of Mask R-CNN for both the real-world and the simulator data are the pixels of an image which present the tire as illustrated in FIGS. 8A and 8B. This transformer can be represented to the common domain with Ne, which encodes the observations in real-world and the observations in the simulator: $o^{er}=Ne(o^r)$, $o^{es}=Ne(o^s)$.

After encoding the input data for domain adaptation, an ensemble of models is learned to predict next encoded real-world state, $o_{k+1}^{er}$, and the reward value, $r_k$, given the current encoded real-world state, $o_k^{er}$ and the action, $u_k$, at each time step k: $r_k^r$, $o_{k+1}^{er}=model_r(o_k^{er}, u_k)$. Using the ensemble of models, the uncertainty of the learned model can thereby be estimated. Having the learned model from the real-world data, $model_r$, and the simulator, a similar approach to Algorithm 1 can be applied to switch to the model with least uncertainty by rewarding the policy in a way that the agent moves to the area which both real-world models and the simulator agree. Algorithm 2 presents the boosting of RL performance by combining off-line data with simulators for image data as shown below.

| Algorithm 2: Boosting RL Performance by Combining Off-line Data with Simulators for Image Data |
|---|
| Learn an encoder to map the observations in real-world $o_r$ and the observations in the simulator to a common domain: $o_{er} = N_e(o_r)$, $o_{es} = N_e(o_s)$ ; |
| Learn an ensemble of models to predict next encoded state, $o_{er}(k + 1)$, given the current encoded state, $o_{er}(k)$ and the action, u(k), at each time step k using the real-world data: r(k), $o_{er}(k + 1) = model_r(o_{er}(k), u(k))$; |
| Initialize RL policy; |
| Initialize buffer D={ }; |
| for each learning iteration do |
|     Initialize the simulator; |
|     for each step do |
|         Encode the state to generate the state common domain ($o_e$) ; |
|         Use the ensemble of models and the RL policy to generate the next state and reward $r_r(k)$, $o_{er}(k + 1) = model_r(o_e(k), u(k))$ , |

Algorithm 2: Boosting RL Performance by Combining
Off-line Data with Simulators for Image Data

```
|    |    |        $r_s(k), o_{es}(k+1) = model_s(o_e(k), u(k))$ ;
|    |    |        Compute weighted standard deviation of real model output
|    |    |            $\sigma_r = \omega_1\sigma(r_r(k)) + \omega_2\sigma(o_{er}(k+1))$ ;
|    |    |        Compute weighted difference between average of real model
|    |    |            output and simulator output + encoder
|    |    |            $d = \omega_3|\bar{r}_r(k) - \bar{r}_s(k)| + \omega_4|\bar{o}_{er}(k+1) - \bar{o}_{es}(k+1)|$ ;
|    |    |        if $\sigma_r$ is lower than a pre-defined threshold then
|    |    |         |    $r_{new} = r_r(k) - \alpha_1\sigma_r - \alpha_2 d$ ;
|    |    |         |    Add sample set $(r_{new}, o_{er}(k+1), o_e(k), u(k))$ to the buffer D;
|    |    |        else
|    |    |         |    $r_{new} = r_s(k) - \sigma_r$ ;
|    |    |         |    Add sample set $(r_{new}, o_{es}(k+1), o_e(k), u(k))$ to the buffer D;
|    |    |        end
|    |    |        Sample a batch from D and Train RL
|    |    end
| end
```

Figure 8C:
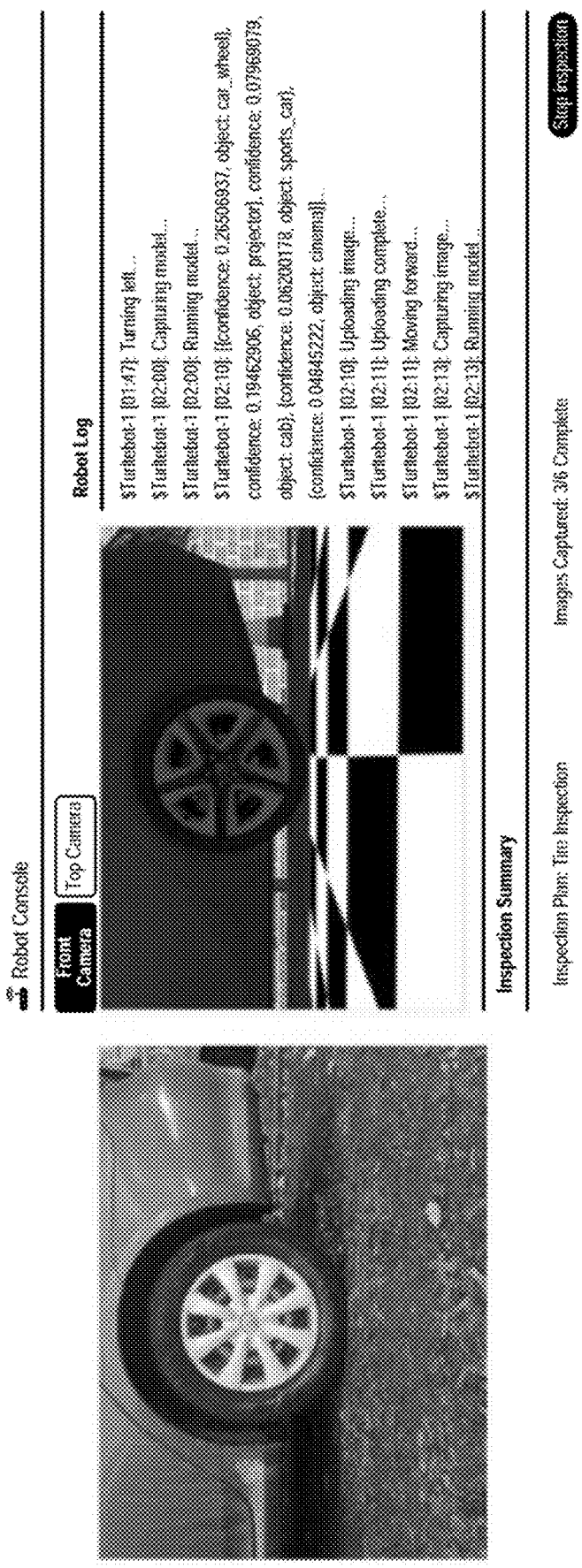
Figure 8D:
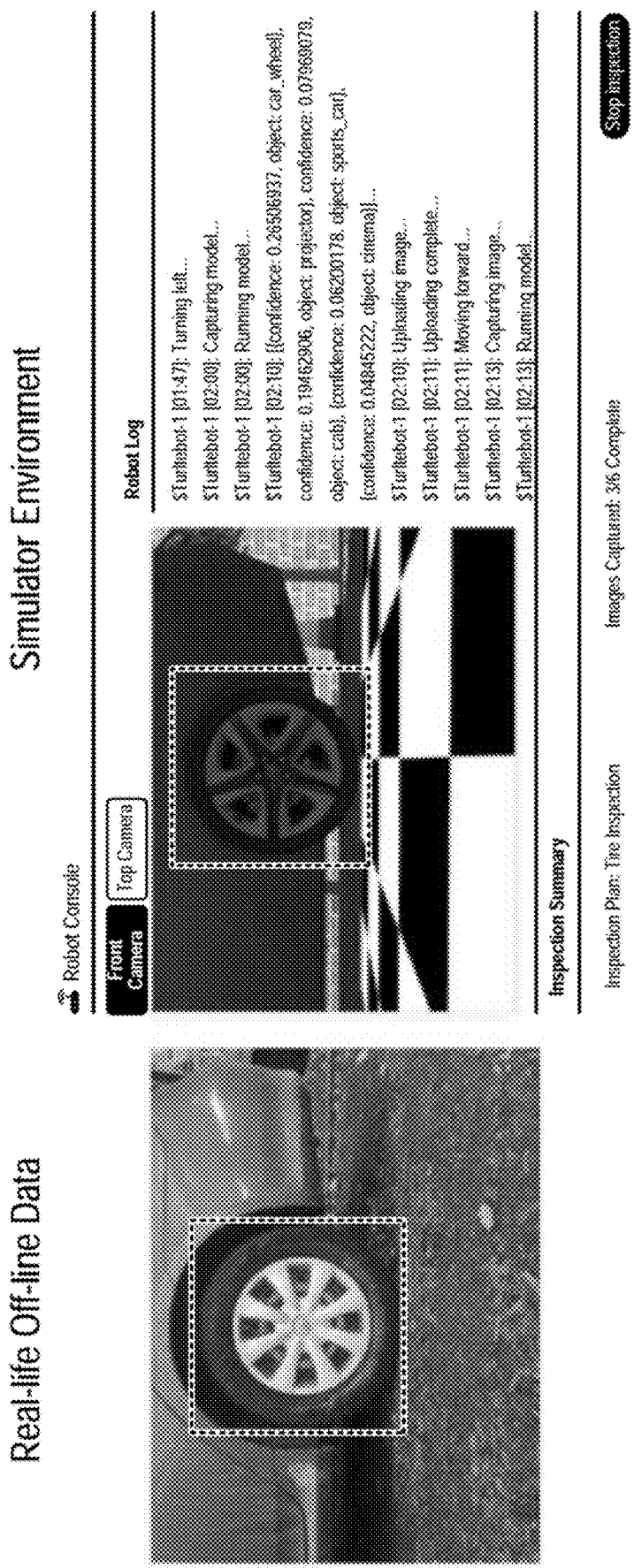
Figure 9A:
FIGS. 9A and 9B illustrates an example execution of YOLO for domain adaptation.
Figure 9B:
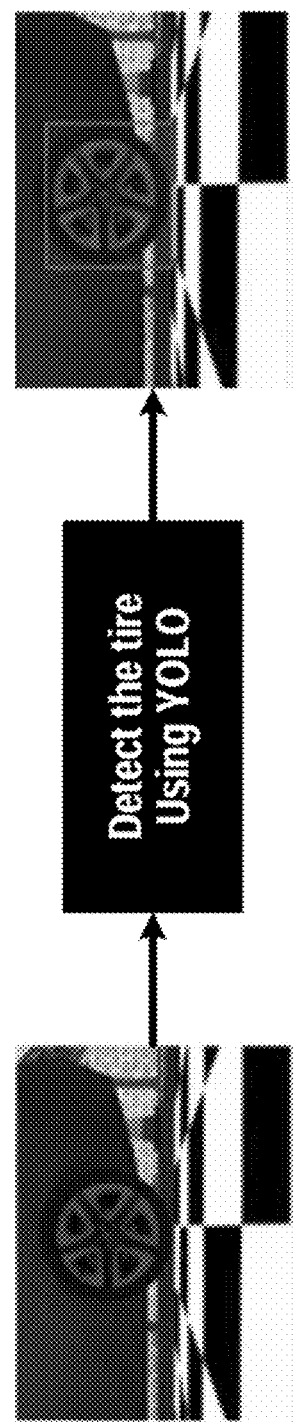

In an example application, consider a robot inspector. The goal for the inspector robot is to move in a right position and take a picture from each of car tires to be analyzed automatically as healthy or deflated. It is not safe to train the robot on real street, it is also expensive to develop a simulator which matches the exact reality. However, the robot can manually operate in the real world and gather off-line data. FIGS. 8C and 8D illustrate sample pictures from the robot operating in real-life and operating in the simulator environment. Since this problem is a control from image, an encoder is first learned to transfer the pictures from the simulator and real-life to the same domain. In an example as shown in FIG. 8D, the You Only Look Once (YOLO) is used, which is a common algorithm for the object detection as the encoder. This model serves as the encoder to map the images from both real-world and the simulator to a common domain. This common domain is the squares which represent a detected tire. FIGS. 9A and 9B illustrates an example execution of YOLO for domain adaptation, specifically from a robot camera image (FIG. 9A) and a simulator (FIG. 9B).

Figure 10:
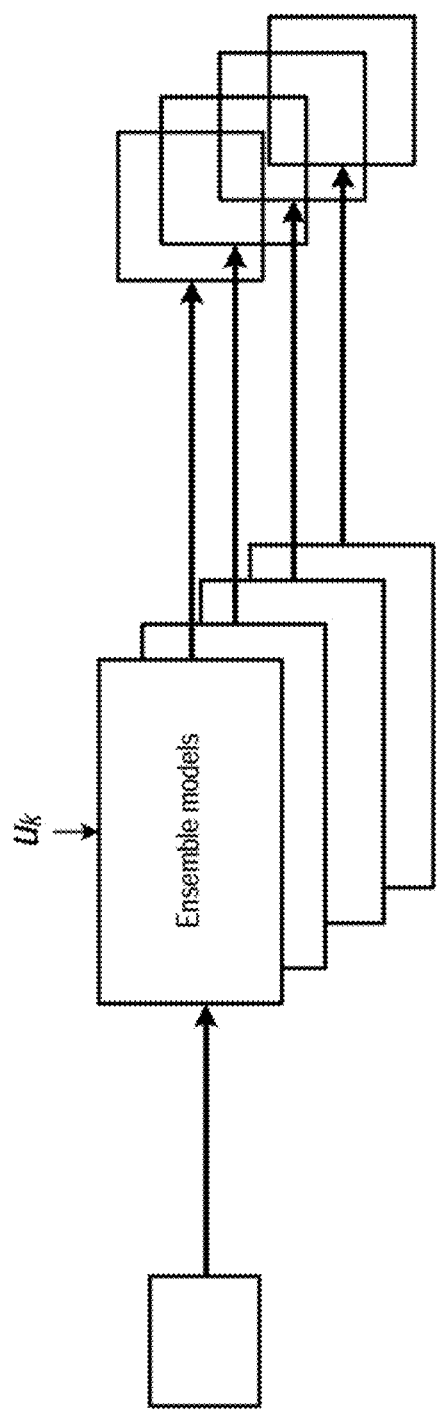
FIG. 10 is an illustration of learning an ensemble of models from encoded real data to predict the size of next square given the current state and action.

Subsequently, the ensemble of models is learned to predict the size of the next square given the current state and action. FIG. 10 illustrates the example ensemble of models.

Figure 11:
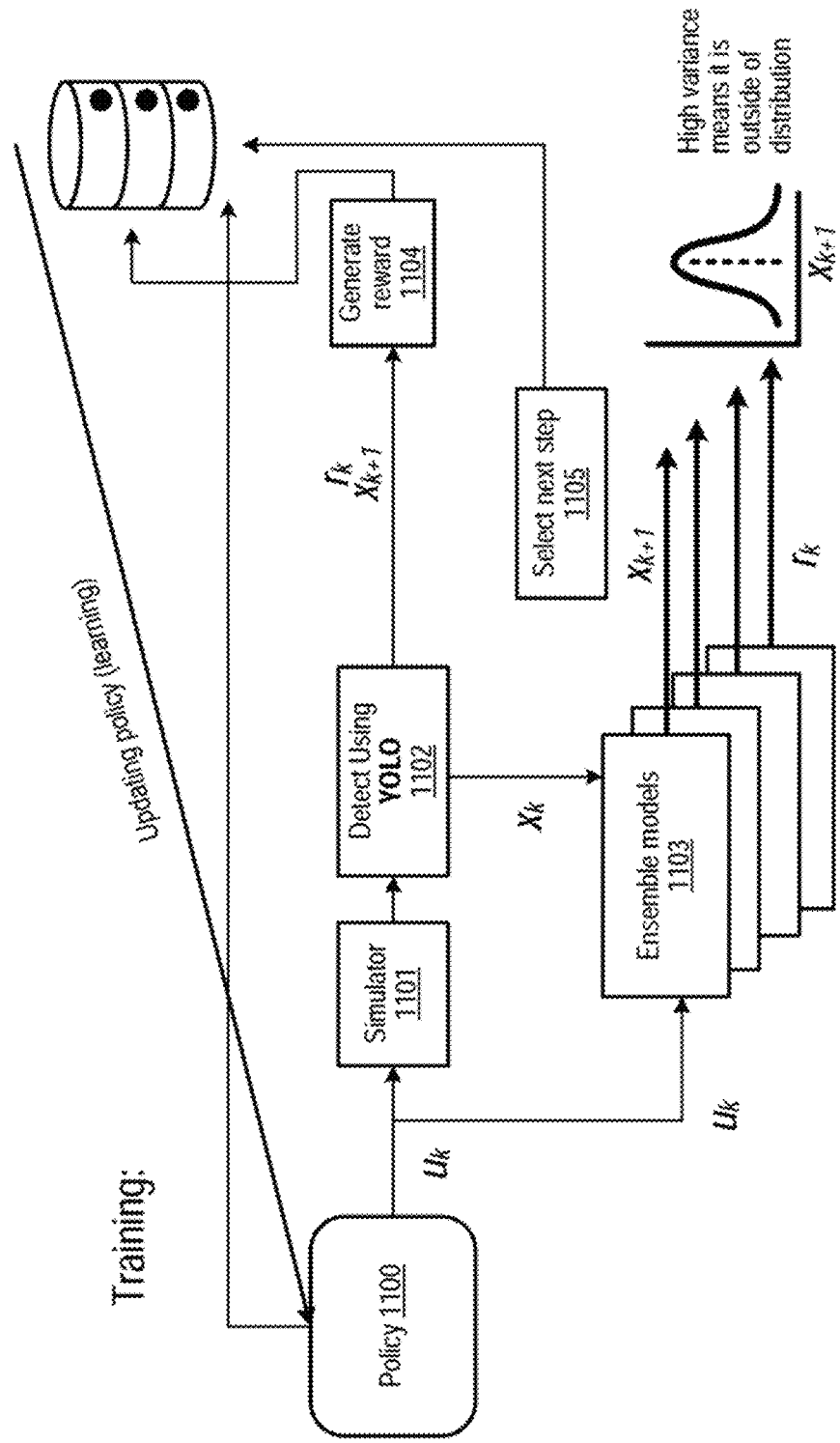
FIG. 11 is an illustration of training process for the control from image example.

Finally, the ensemble of models and the simulator are used to train the robot according to Algorithm 2. FIG. 11 illustrates an example of the training process for the robot. Similar to the implementation in FIG. 6, based on the policy 1100, simulator 1101 and ensemble models 1103 are executed based on Algorithm 2, and detection is executed using the YOLO algorithm for output of the simulator to detect a specific component (e.g., a tire, a headlight, etc.), the output of which is provided to the ensemble models 1103 based on Algorithm 2. Based on the execution of Algorithm 2, the reward is generated at 1104, and the next step is selected at 1105. The generated reward is used for training the reinforcement learning and updating the policy 1100.

The actions include moving direction and speed, the observations are the camera images, and the original reward is the difference between ideal tire size and the observed squares, and a negative reward for any observation which does not include a tire. Any traditional reinforcement learning algorithm can be used for training. Techniques such as Soft Actor Critics (SAC) can be used to update the policy.

Even when the simulators are accurate at the purchase time, it is very costly to keep them updated over time. The proposed solution is robust to simulator error, and therefore, it requires less maintenance in keeping the simulators updated. Compared to other robust RL algorithms, the proposed approach does not require the distribution of uncertainties in the simulator. Less complexity leads to fewer potential errors and lower costs. Moreover, it has lower computational cost during the training. Finally, the proposed approach has better performance compared to the state-of-the-art methods (higher overall cumulative rewards)

Figure 12:
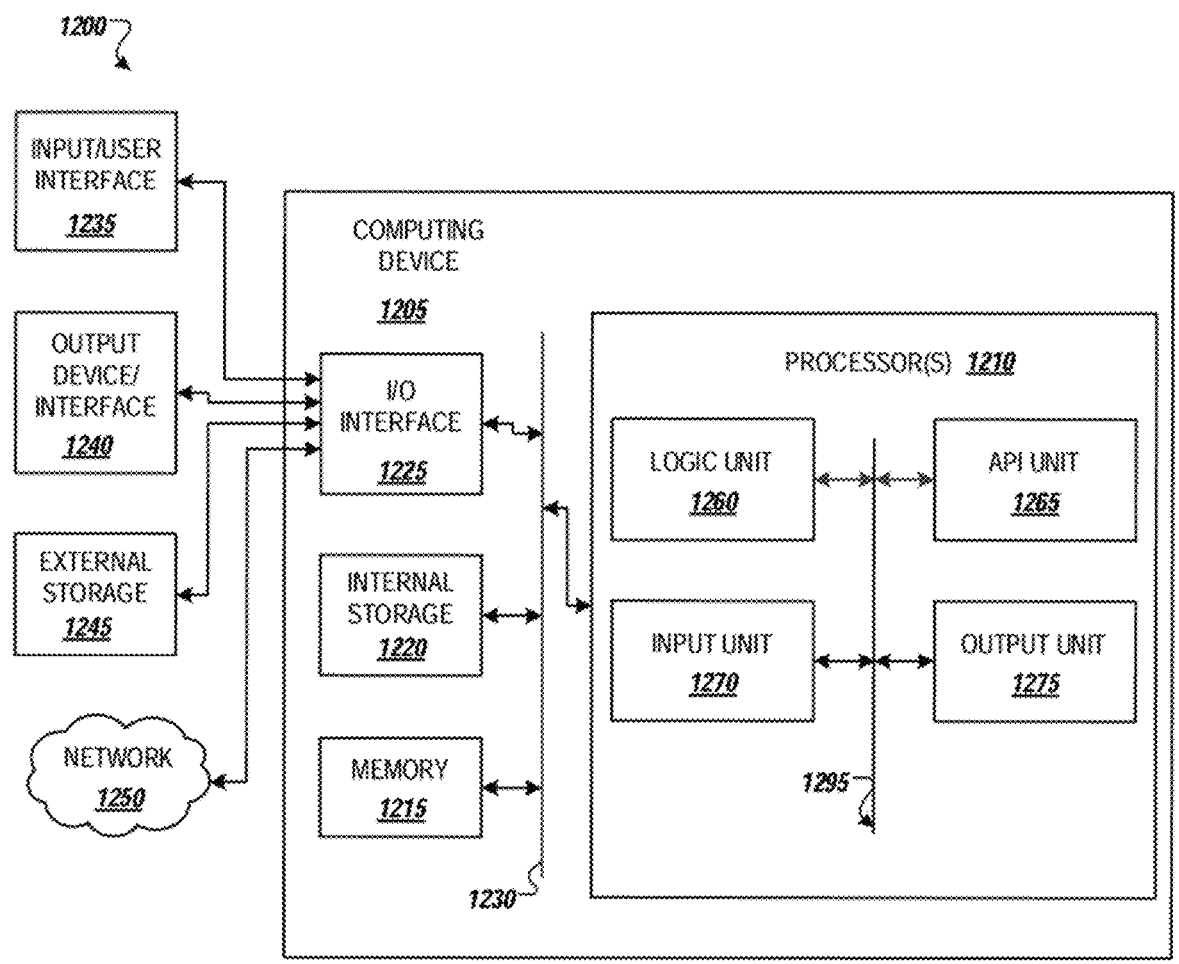
FIG. 12 illustrates an example computing environment with an example computer device suitable for use in some example implementations.

FIG. 12 illustrates an example computing environment with an example computer device suitable for use in some example implementations. Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computer device 1205. I/O interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

Figure 4:
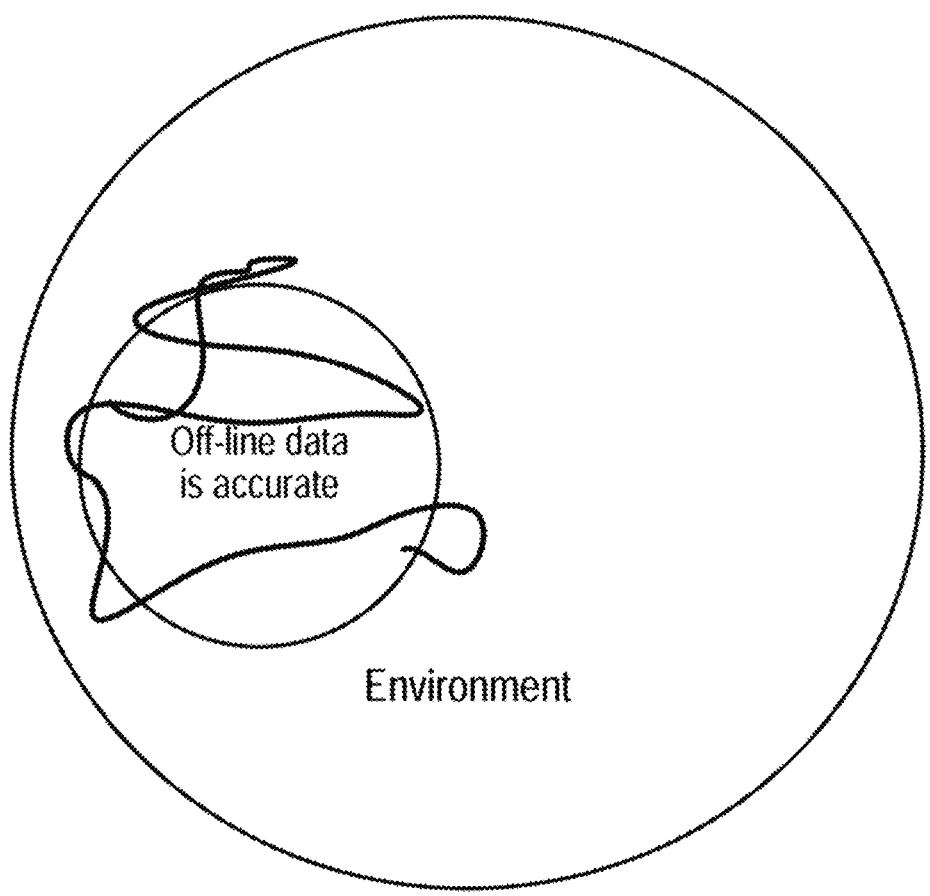
FIG. 4 illustrates how negative reward discourages the agent to explore areas where the off-line data is not accurate.

As described in Algorithm 1 and FIG. 4, processor(s) 1210 can be configured to conduct training of a reinforcement learning policy, which can involve executing an ensemble of models and a simulator to predict a next state, the ensemble of models trained from using off-line data. For predictions of the next state from the execution of the ensemble of models being in disagreement, processor(s) 1210 can be configured to use the next state predicted from the execution of the simulator as a sample for training the reinforcement learning algorithm; and impose a penalty on the reward for the training the reinforcement learning algorithm based on a variance of the predictions of the next state from the ensemble of models. For the predictions of the next state from the execution of the ensemble of models being in agreement, processor(s) 1210 can be configured to use weighted predictions of the next state from the execution of the ensemble of models as the sample for training the reinforcement learning algorithm; and adjust the reward on the ensemble of models based on the variance of the predictions of the ensemble of models and a difference between the predictions of the next state from the execution of the ensemble of models and the next state predicted from the execution of the simulator. Depending on the desired implementations, the predictions of the next state from the execution of the ensemble of models are in disagreement when the variance exceeds a threshold, and the predictions of the next state from the execution of the ensemble of models are in agreement when the variance is within a threshold.

Depending on the desired implementation, the difference between the predictions of the next state from the execution of the ensemble of models and the next state predicted from the execution of the simulator is a difference of between average of the predictions of the next state from the execution of the ensemble of models and the next state predicted from the execution of the simulator as described with respect to Algorithm 1.

Processor(s) 1210 can be configured to train an encoder to translate the off-line images and output images from the simulator into a common domain as described with respect to FIGS. 8A to 11. Depending on the desired implementation, the off-line data can involve off-line images, wherein the ensemble of models is trained from encoded images in the common domain generated from the encoder as executed on the off-line images, and wherein the ensemble of models is configured to predict the next state as an image representation in the common domain; wherein the difference between the predictions of the next state from the execution of the ensemble of models and the next state predicted from the execution of the simulator is determined based on executing the encoder on the output images from the simulator to translate the output images to the common domain and determining the difference between the translated output images in the common domain and the image representation as illustrated in Algorithm 2.

In some example implementations, the uncertainty of the simulator is known. In such example implementations, processor(s) 1210 can be configured to use the weighted predictions of the next state from the execution of the ensemble of models as the sample for training the reinforcement learning algorithm by using the weighted predictions of the next state from the execution of the ensemble of models and the next state predicted from the execution of the simulator as samples for training the reinforcement learning algorithm based on uncertainty of the simulator and uncertainty of the ensemble of models as described with respect to Algorithm 1.

As illustrated in FIG. 7, processor(s) 1210 can be configured to deploy the reinforcement learning algorithm; and periodically train the reinforcement learning algorithm through the executing of the ensemble of models and the simulator based on accumulation of new off-line data.

Processor(s) 1210 can be configured to initialize a policy of the reinforcement learning algorithm; wherein the executing the ensemble of models and the simulator to predict the next state is conducted according to the policy; wherein the sample for training the reinforcement learning algorithm is accumulated into a sample set from which a batch of samples from the sample set are used to train the reinforcement learning algorithm as illustrated in Algorithm 1 and Algorithm 2.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for training of a reinforcement learning policy, comprising:
   executing in parallel an ensemble of models and a simulator to predict a next state, the ensemble of models trained from using off-line data;
   for predictions of the next state from the execution of the ensemble of models being in disagreement when a standard deviation of outputs from the ensemble of models exceeds a threshold:
   using the next state predicted from the execution of the simulator as a sample for training the reinforcement learning policy; and
   imposing a penalty on a reward for the training the reinforcement learning policy based on a variance of the predictions of the next state from the ensemble of models;
   for the predictions of the next state from the execution of the ensemble of models being in agreement when the standard deviation of outputs from the ensemble of models is within the threshold:
   using weighted predictions of the next state from the execution of the ensemble of models as the sample for training the reinforcement learning policy; and
   adjusting the reward on the ensemble of models based on the variance of the predictions of the ensemble of models and a difference between the predictions of the next state from the execution of the ensemble of models and the next state predicted from the execution of the simulator.

2. The method of claim 1, wherein the difference between the predictions of the next state from the execution of the ensemble of models and the next state predicted from the execution of the simulator is a difference between a weighted average of the predictions of the next state from the execution of the ensemble of models and the next state predicted from the execution of the simulator.

3. The method of claim 1, wherein the off-line data comprises off-line images, wherein the method further comprises training an encoder to translate the off-line images and output images from the simulator into a common domain.

4. The method of claim 3, wherein the off-line data comprises off-line images, wherein the ensemble of models is trained from encoded images in the common domain generated from the encoder as executed on the off-line images, and wherein the ensemble of models is configured to predict the next state as an image representation in the common domain;
 wherein the difference between the predictions of the next state from the execution of the ensemble of models and the next state predicted from the execution of the simulator is determined based on executing the encoder on the output images from the simulator to translate the output images to the common domain and determining the difference between the translated output images in the common domain and the image representation.

5. The method of claim 1, when the uncertainty of the simulator is known, wherein the using the weighted predictions of the next state from the execution of the ensemble of models as the sample for training the reinforcement learning algorithm comprises:
 using the weighted predictions of the next state from the execution of the ensemble of models and the next state predicted from the execution of the simulator as samples for training the reinforcement learning algorithm based on uncertainty of the simulator and uncertainty of the ensemble of models.

6. The method of claim 1, wherein the predictions of the next state from the execution of the ensemble of models are in disagreement when the variance exceeds a threshold.

7. The method of claim 1, wherein the predictions of the next state from the execution of the ensemble of models are in agreement when the variance is within a threshold.

8. The method of claim 1, further comprising:
 deploying the reinforcement learning policy; and
 periodically training the reinforcement learning policy through the executing of the ensemble of models and the simulator based on accumulation of new off-line data.

9. The method of claim 1, further comprising:
 initializing a policy of the reinforcement learning policy;
 wherein the executing the ensemble of models and the simulator to predict the next state is conducted according to the policy;
 wherein the sample for training the reinforcement learning policy is accumulated into a sample set from which a batch of samples from the sample set are used to train the reinforcement learning algorithm.

10. A non-transitory computer readable medium, storing instructions for training of a reinforcement learning policy, the instructions comprising:
 executing in parallel an ensemble of models and a simulator to predict a next state, the ensemble of models trained from using off-line data;
 for predictions of the next state from the execution of the ensemble of models being in disagreement when a standard deviation of outputs from the ensemble of models exceeds a threshold:
 using the next state predicted from the execution of the simulator as a sample for training the reinforcement learning policy; and
 imposing a penalty on a reward for the training the reinforcement learning policy based on a variance of the predictions of the next state from the ensemble of models;
 for the predictions of the next state from the execution of the ensemble of models being in agreement when the standard deviation of outputs from the ensemble of models is within the threshold:
 using weighted predictions of the next state from the execution of the ensemble of models as the sample for training the reinforcement learning policy; and
 adjusting the reward on the ensemble of models based on the variance of the predictions of the ensemble of models and a difference between the predictions of the next state from the execution of the ensemble of models and the next state predicted from the execution of the simulator.

11. The non-transitory computer readable medium of claim 10, wherein the difference between the predictions of the next state from the execution of the ensemble of models and the next state predicted from the execution of the simulator is a difference between a weighted average of the predictions of the next state from the execution of the ensemble of models and the next state predicted from the execution of the simulator.

12. The non-transitory computer readable medium of claim 10, wherein the off-line data comprises off-line images, wherein the instructions further comprises training an encoder to translate the off-line images and output images from the simulator into a common domain.

13. The non-transitory computer readable medium of claim 12, wherein the off-line data comprises off-line images, wherein the ensemble of models is trained from encoded images in the common domain generated from the encoder as executed on the off-line images, and wherein the ensemble of models is configured to predict the next state as an image representation in the common domain;
 wherein the difference between the predictions of the next state from the execution of the ensemble of models and the next state predicted from the execution of the simulator is determined based on executing the encoder on the output images from the simulator to translate the output images to the common domain and determining the difference between the translated output images in the common domain and the image representation.

14. The non-transitory computer readable medium of claim 10, when the uncertainty of the simulator is known, wherein the using the weighted predictions of the next state from the execution of the ensemble of models as the sample for training the reinforcement learning algorithm comprises:
 using the weighted predictions of the next state from the execution of the ensemble of models and the next state predicted from the execution of the simulator as samples for training the reinforcement learning algorithm based on uncertainty of the simulator and uncertainty of the ensemble of models.

15. The non-transitory computer readable medium of claim 10, wherein the predictions of the next state from the execution of the ensemble of models are in disagreement when the variance exceeds a threshold.

16. The non-transitory computer readable medium of claim 10, wherein the predictions of the next state from the execution of the ensemble of models are in agreement when the variance is within a threshold.

17. The non-transitory computer readable medium of claim 10, further comprising:
 deploying the reinforcement learning policy; and periodically training the reinforcement learning policy through the executing of the ensemble of models and the simulator based on accumulation of new off-line data.

18. The non-transitory computer readable medium of claim 10, further comprising:
initializing a policy of the reinforcement learning policy;
wherein the executing the ensemble of models and the simulator to predict the next state is conducted according to the policy;
wherein the sample for training the reinforcement learning policy is accumulated into a sample set from which a batch of samples from the sample set are used to train the reinforcement learning algorithm.

19. An apparatus, configured to train a reinforcement learning policy, the apparatus comprising:
a processor, configured to:
execute in parallel an ensemble of models and a simulator to predict a next state, the ensemble of models trained from using off-line data;
for predictions of the next state from the execution of the ensemble of models being in disagreement when a standard deviation of outputs from the ensemble of models exceeds a threshold:
use the next state predicted from the execution of the simulator as a sample for training the reinforcement learning policy; and
impose a penalty on the reward for the training the reinforcement learning algorithm based on a variance of the predictions of the next state from the ensemble of models;
for the predictions of the next state from the execution of the ensemble of models being in agreement when the standard deviation of outputs from the ensemble of models is within the threshold:
use weighted predictions of the next state from the execution of the ensemble of models as the sample for training the reinforcement learning policy; and
adjust the reward on the ensemble of models based on the variance of the predictions of the ensemble of models and a difference between the predictions of the next state from the execution of the ensemble of models and the next state predicted from the execution of the simulator.

* * * * *